(12) United States Patent
Sedlacek et al.

(10) Patent No.: US 8,509,120 B2
(45) Date of Patent: Aug. 13, 2013

(54) PRESERVING MID-CALL STATE IN IMS CENTRALIZED SERVICES SESSIONS

(75) Inventors: Ivo Sedlacek, Lund (SE); Ralf Keller, Würselen (DE)

(73) Assignee: Telefonakiebolaget LM Ericsson (publ), Stockholm (SE)

( * ) Notice: Subject to any disclaimer, the term of this patent is extended or adjusted under 35 U.S.C. 154(b) by 259 days.

(21) Appl. No.: 12/952,968

(22) Filed: Nov. 23, 2010

(65) Prior Publication Data

US 2011/0292841 A1   Dec. 1, 2011

Related U.S. Application Data

(60) Provisional application No. 61/350,165, filed on Jun. 1, 2010.

(51) Int. Cl.
*H04W 40/00*   (2009.01)
(52) U.S. Cl.
USPC ............................................ 370/260; 370/328
(58) Field of Classification Search
USPC .................................. 370/328, 360
See application file for complete search history.

(56) References Cited

U.S. PATENT DOCUMENTS

| 2011/0058520 | A1* | 3/2011 | Keller et al. | 370/328 |
|---|---|---|---|---|
| 2011/0141979 | A1* | 6/2011 | Keller et al. | 370/328 |
| 2011/0225307 | A1* | 9/2011 | George et al. | 709/227 |

FOREIGN PATENT DOCUMENTS

| WO | 2009130042 A2 | 10/2009 |
|---|---|---|
| WO | 2010054698 A1 | 5/2010 |

OTHER PUBLICATIONS

3RD GPP, Source: Nortel, Huawei: mid-call services for, SR-VVV when Gm (on the Tarfet Access) or I1 can be used, pp. 1-14, Mar. 30-Apr. 3, 2009, china.*
3RE GPP, James Ni, "IMS centralized services overview" pp. 1-63 Dec. 11, 2009.*
3RD Generation Partnership Project, Source: Nortel, Huawei, 'Mid Call Services for, SR-VCC When Gm (on the Target Access) or I1 Can Be Used, 3GPP TSG SA WG2 Meeting #72, TD S2-092388, pp. 1-14, Mar. 30-Apr. 3, 2009, Hangzhou, China.*
Salkintzis, A. K. et al. "Voice Call Handover Mechanisms in Next-Generation 3GPP Systems." IEEE Communications Magazine, Feb. 2009.
3RD Generation Partnership Project. 3GPP TS 24.292, V10.1.0 (Sep. 2010). 3rd Generation Partnership Project; Technical Specification Group Core Network and Terminals; IP Multimedia (IM) Core Network (CN) subsystem Centralized Services (ICS); Stage 3 (Release 10). Sep. 2010.

(Continued)

*Primary Examiner* — Dang Ton
*Assistant Examiner* — Mewale Ambaye
(74) *Attorney, Agent, or Firm* — Coats & Bennett, P.L.L.C.

(57) ABSTRACT

Techniques for managing multiple ICS sessions in an IMS network are described. In one method, a MSC server detects that a user terminal has been transferred from a first access network to a second access network and, in response, sends a message to an SCC AS, the message indicating transfer of the user terminal. The MSC server receives, in response, one or more requests for MSC server-assisted mid-call feature services for the user terminal, and assigns transaction identifiers to one or more sessions held for the user terminal or to one or more conference participants corresponding to the user terminal. Corresponding techniques carried out at an SCC AS are also described.

21 Claims, 6 Drawing Sheets

(56) References Cited

OTHER PUBLICATIONS

3RD Generation Partnership Project. 3GPP TS 24.237, V10.0.0 (Sep. 2010). 3rd Generation Partnership Project; Technical Specification Group Core Network and Terminals; IP Multimedia (IM) Core Network (CN) subsystem IP Multimedia Subsystem (IMS) Service Community; Stage 3 (Release 10). Sep. 2010.

Noldus, R. et al. "Multi-Access for the IMS Network." Ericsson Review No. 2, 2008.

3RD Generation Partnership Project. "Mid-Call Service Continuity for ICS UE Handover." 3GPP TSG SA WG2 Meeting #80, S2-103949, Brunstad, Norway, Aug. 30-Sep. 3, 2010.

3RD Generation Partnership Project. "Service Continuity of ICS UE and MSC Server Assisted Mid-Call Feature." 3GPP TSG SA WG2 Meeting #80, S2-103948, Brunstad, Norway, Aug. 30-Sep. 2, 2010.

3RD Generation Partnership Project. 3GPP TS 23.292, V10.0.0 (2010-03). 3rd Generation Partnership Project; Technical Specification Group Services and System Aspects; IP Multimedia Subsystem (IMS) centralized services; Stage 2 (Release 10). Mar. 2010.

3RD Generation Partnership Project, Source: Nortel, Huawei, 'Mid Call Services for , SR-VCC When Gm (on the Target Access) or I1 Can Be Used, 3GPP TSG SA WG2 Meeting #72, TD S2-092388, pp. 1-14, Mar. 30-Apr. 3, 2009, Hangzhou, China.

\* cited by examiner

PRESERVING MID-CALL STATE IN IMS CENTRALIZED SERVICES SESSIONS

RELATED APPLICATION

This application claims priority under 35 U.S.C. §119(e) to U.S. provisional patent application Ser. No. 61/350,165, filed Jun. 1, 2010, the entire contents of which are incorporated by reference herein.

TECHNICAL FIELD

The present invention relates generally to wireless communication systems and more particularly relates to managing sessions in networks providing IP Multimedia Subsystem (IMS) Centralized Services.

BACKGROUND

The 3rd-Generation Partnership Project (3GPP) is developing specifications for network-based management of all wireless services under the IP Multimedia Subsystem umbrella. An important goal of this project is to support the delivery of consistent services to a user regardless of whether the user is attached to a wireless network in the circuit-switched (CS) domain or in the packet-switched (PS) domain. This centralization of service management, called IMS Centralized Services, or ICS, provides a number of features for users, including support for multiple active devices associated with a single user, handling of legacy GSM devices in addition to IMS-capable devices, and standardized support for supplementary services such as call forwarding and conference calling. ICS also supports various types of media, such as video calling. With ICS, media streams can be added to or removed from ongoing sessions.

The architectural requirements for ICS are specified by 3GPP in 3GPP TS 23.292, "$3^{rd}$ Generation Partnership Project; Technical Specification Group Services and System Aspects; IP Multimedia Subsystem (IMS) centralized services; Stage 2 (Release 10)," v 10.2.0, September 2010. As described in that document, an ICS-enabled mobile terminal (user equipment, or UE, in 3GPP terminology) accessing a wireless network in the CS domain (or accessing a PS access network that does not support the full-duplex speech/video component of an IMS service) establishes only a single circuit-switched call, regardless of how many ICS sessions are established for the mobile terminal (using Gm signaling). The circuit-switched call serves as the sole media bearer, and is thus shared by all the sessions. At any given time, the circuit-switched call is associated with the active ICS session.

When the ICS mobile terminal is operating in a GERAN network with dual-transfer mode (DTM) support, or if the ICS mobile terminal is operating in a UTRAN network, the mobile terminal can transmit and receive packet-switched Internet Protocol (IP) data while simultaneously maintaining a circuit-switched bearer. Thus, in these scenarios, the mobile terminal can use SIP-based signaling (at the Gm reference point) to manage the ICS sessions. However, if the network steers the ICS mobile terminal to a GERAN network without DTM support then the mobile terminal is no longer able to use Gm signaling to manage the sessions, since simultaneous transport of IP data and maintenance of a circuit-switched call becomes unsupported. In such a case, the circuit-switched call is kept, while IP transport is suspended.

SUMMARY

In various embodiments of the invention, when a circuit-switched call controlled by Gm signaling is established, or when Gm control of the circuit-switched call is added, then a Service Centralization and Continuity Application Server (SCC AS) requests a Mobile Switching Center (MSC) server to inform the SCC AS about the access network used by a user terminal configured for IMS Centralized Service (ICS) support, and whether simultaneous transport of IP data and support of a circuit-switched call by the user terminal possible. The MSC server keeps the SCC AS informed of changes to the status of the ICS user terminal. As a result, when the MSC server informs the SCC AS that the user terminal has moved to a network that does not support simultaneous circuit-switched calls and IP data transport, such as GERAN without DTM, the SCC AS will trigger the MSC server-assisted mid-call feature and the MSC server will create a transaction identifier for each held circuit-switched call. Meanwhile, when the user terminal detects that it has moved to GERAN without DTM, the user terminal will also create corresponding transaction identifiers for the held circuit-switched call. In this manner, the held session will be preserved.

In another approach, when the user terminal detects that it has moved to GERAN without DTM, it will put the circuit-switched call controlled by Gm signaling on hold, using conventional circuit-switched signaling techniques, and will perform a packet-switched to circuit-switched (PS to CS) access transfer, using non-ICS procedures as specified in 3GPP TS 24.237. When the PS to CS access transfer request using non-ICS procedures for the active session is received, the SCC AS can determine that this session transfer request has been sent by the user terminal (because the request uses a Session Transfer Number, STN, and not a Session Transfer Number for Single Radio Voice Call Continuity, STN-SR), and that the DTM coverage must have been lost. The SCC AS then performs the regular PS to CS access transfer, including transfer of the held session using MSC server-assisted mid-call feature (if supported).

Example methods for managing multiple ICS sessions at an SCC AS and an MSC server are described. In an example method, a MSC server detects that a user terminal has been transferred from a first access network to a second access network and, in response, sends a first message to an SCC AS, the first message indicating that the user terminal has been transferred. The MSC server receives, in response to this first message, one or more requests for MSC server-assisted mid-call feature services for the user terminal, and assigns transaction identifiers to one or more sessions held for the user terminal or to one or more conference participants corresponding to the user terminal, in response to these requests.

In some embodiments, the first message comprises information indicating a type of the second network. In some embodiments, the MSC server first determines that the user terminal is unable to simultaneously support a circuit-switched call and the transport of IP data in the second access network, in which case the first message is sent to the SCC AS in response to the detecting of the user terminal transfer and this determining, and includes an indication that the user terminal is unable to simultaneously support a circuit-switched call and the transport of IP data in the second network. In various embodiments, the first message comprises one of: a SIP UPDATE message; a SIP INFO message; and a SIP NOTIFY message.

In several embodiments, the MSC server first receives, from the SCC AS, a SIP request or SIP response, the SIP request or SIP response including an indication that the SCC AS is requesting notification of any transfer of the user terminal, in which case the first message described above is sent only after determining that this indication has been received. In other embodiments, the MSC server receives, from the SCC AS, a SIP request or SIP response, the SIP request or SIP response including an indication that the SCC AS is requesting notification of transfers of the user terminal to an access network in which the user terminal cannot support transport of IP data simultaneously with a circuit-switched call, in which case the first message described above is sent only after determining that this indication has been received. In either case, the indication received from the SCC AS may comprise a feature tag.

In still other embodiments, the MSC server first receives, from the SCC AS, a SIP SUBSCRIBE request indicating that the SCC AS is requesting notification of any transfer of the user terminal or indicating that the SCC AS is requesting notification when the user terminal is transferred to an access network in which the user terminal cannot support transport of IP data simultaneously with a circuit-switched call. In these embodiments, the first message is sent only after determining, at the MSC server, that the SIP SUBSCRIBE request has been received In another example method, an SCC AS receives a first message from a MSC server, the first message indicating that a user terminal engaged in one or more ICS sessions has been transferred from a first access network to a second access network. In response to this first message, the SCC AS sends one or more requests for MSC server-assisted mid-call feature services for the user terminal and releases an access leg corresponding to the user terminal and controlled by Gm signaling. As with the MSC server-based methods described above, in some embodiments this first message comprises information indicating a type of the second access network, while in others the message may include instead (or in addition) an indication that the user terminal is unable to simultaneously support a circuit-switched call and the transport of IP data in the second network. In any of these embodiments, the requests for MSC server-assisted mid-call feature services for the user terminal are sent in response to this indication. The first message is a SIP message, in many embodiments, such as a SIP UPDATE message, a SIP INFO message, or a SIP NOTIFY message.

In some embodiments, the SCC AS first sends, to the MSC server, at least one of: a SIP request including an indication that the SCC AS is requesting notification when the user terminal is transferred; a SIP response including an indication that the SCC AS is requesting notification when the user terminal is transferred; a SIP request including an indication that the SCC AS is requesting notification when the user terminal is transferred to an access network in which the user terminal cannot support transport of IP data simultaneously with a circuit-switched call; a SIP response that includes an indication that the SCC AS is requesting notification when the user terminal is transferred to an access network in which the user terminal cannot support transport of IP data simultaneously with a circuit-switched call; a SIP SUBSCRIBE request including an indication that the SCC AS is requesting notification when the user terminal is transferred; and a SIP SUBSCRIBE request including an indication that the SCC AS is requesting notification when the user terminal is transferred to an access network in which the user terminal cannot support transport of IP data simultaneously with a circuit-switched call. Any one of these indications may comprise a feature tag, in some embodiments.

In still another example method, an SCC AS receives a SIP UPDATE message indicating that a circuit-switched call anchored at the SCC AS is being placed on hold and determines that an ICS session corresponding to the circuit-switched call is still active, by detecting that the SIP UPDATE message was sent via an MSC server. The SCC AS receives a SIP INVITE message comprising a PS-CS session transfer request corresponding to the ICS session, and sends one or more requests for MSC server-assisted mid-call feature services for the ICS session and releases an access leg controlled by Gm signaling and corresponding to the ICS session.

Apparatus configured to carry out the methods summarized above are also described, including an SCC AS and an MSC server.

Of course, the present invention is not limited to the embodiments, contexts, and features summarized above, nor is it limited to the specific example embodiments detailed below. Instead, it will be understood that the present invention may be carried out in ways other than those specifically set forth herein without departing from essential characteristics of the invention as set forth in the appended claims. Upon reading the following description and viewing the attached drawings, the skilled practitioner will thus recognize that the described embodiments are illustrative and not restrictive, and that all changes coming within the scope of the appended claims are intended to be embraced therein.

DETAILED DESCRIPTION

Figure 1:
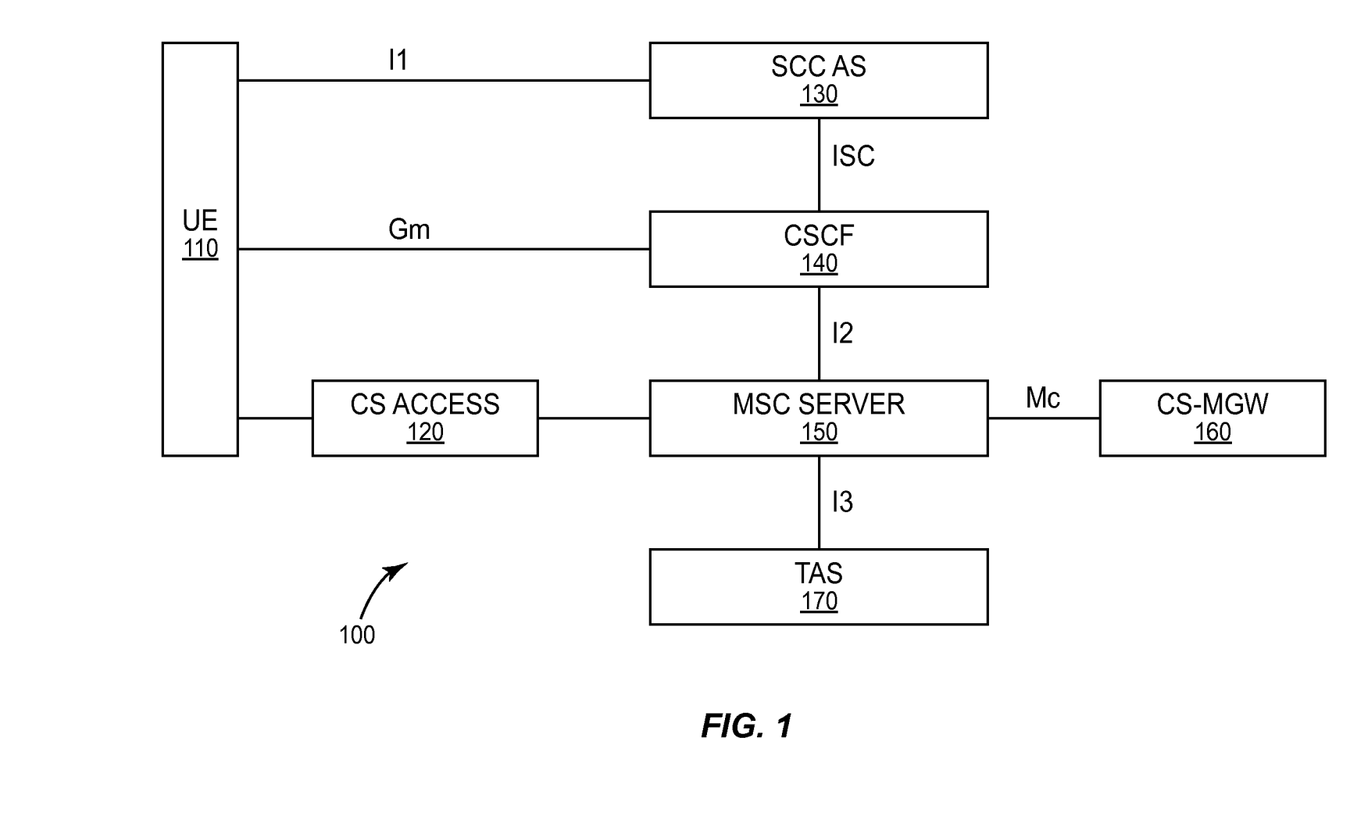
FIG. 1 illustrates components of an ICS-enabled network.

FIG. 1 illustrates several components of a wireless network 100 that supports IMS Centralized Services (ICS). User Equipment (UE) 110 obtains circuit-switched services (e.g., conventional voice call services) through a circuit-switched access network 120, which uses a radio access technology that supports circuit-switched services, such as the Wideband-CDMA (W-CDMA) technology used in systems based on 3GPP's Universal Terrestrial Radio Access Network (UTRAN). (Note that as used herein, the term "UE," which refers generally to radio access terminals, is used synonymously with "mobile terminal," "mobile equipment," and "user terminal." Of course, not every access terminal is necessarily mobile, as fixed installations are not uncommon. Thus, the terms "mobile terminal" or "mobile equipment" are intended to refer to radio access terminals in general, and are not meant to be limited to devices that are movable or portable. Likewise, the term "user terminal" is meant to refer generally to radio access terminals, including devices used in machine-tomachine, or M2M, applications, and is not limited to devices carried or generally used by a person.)

The Mobile Switching Center Server (MSC server) 150 controls the network switching subsystem elements of wireless network 100. Like the CS Access network 120, the MSC server is standards-based, communicating with the other components of the network using standards such as media gateway control protocol, Megaco/H.248, session initiation protocol (SIP), etc. For instance, the MSC server 150 communicates with circuit-switched Media Gateway (CS-MGW) 160 over a media gateway control protocol such as Megaco or MGCP. The CS-MGW 160 provides a translation service to connect digital media streams flowing to and from the CS Access network to the core network and the Public-Switched Telephone Network (PSTN). Similarly, MSC server 150 communicates with Telephony Applications Server (TAS) 170 through the "I3" reference point, defined in 3GPP standards. TAS 170 provides supplementary services to UE 110, i.e., services that are not directly related to the routing of messages through the network 100, such as in-network voicemail services, automatic call forwarding, conference bridges, and the like.

The Call Session Control Function (CSCF) 140 is a key component for signaling and control within the IMS network. CSCF 140 is responsible for all signaling between the Transport Plane, Control Plane, and Application Plane of IMS, using the SIP Protocol. The interface between UE 110 and the CSCF is defined by 3GPP as the "Gm" reference point, while the interface between the CSCF 140 and MSC server 150 is known as the "I2" reference point. The CSCF 140 includes a Proxy CSCF (P-CSCF) function, which is a proxy for all SIP messages from end-points (such as UE 110) to the rest of the IMS network, and a Serving CSCF (S-CSCF) function, which provides an interface to application servers in IMS's Application Plane (e.g., to the SCC AS 130 via the "ISC" reference point, as seen in FIG. 1.) The CSCF 140 also includes an Interrogating CSCF (I-CSCF), which provides a proxy between the P-CSCF as entry point and S-CSCF as control point for applications found in the Applications Plane.

The Service Centralization and Continuity Application Server (SCC AS) 130 is a dedicated application server connected to the IMS, as any other application server, over a standard ISC interface. The SCC AS 130 enables seamless handover of voice and multimedia sessions and synchronization of services. Supported services can include, for example, voice over LTE and mobile video over LTE services, and the handover of these services to and from UTRAN systems.

As noted above, when an ICS mobile terminal (such as UE 110) is operating in a GERAN network with dual-transfer mode (DTM) support, or if the ICS mobile terminal is operating in a UTRAN network, the mobile terminal can transmit and receive IP data while simultaneously maintaining a circuit-switched bearer. In these scenarios, the mobile terminal can use SIP-based signaling (at the Gm reference point) to manage the ICS sessions. However, if the network steers the ICS mobile terminal to a GERAN network without DTM support, then the mobile terminal is no longer able to use Gm signaling to manage the sessions, since simultaneous transport of IP data and maintenance of a circuit-switched call is no longer supported. In such a case, the circuit-switched call is kept, while IP transport is suspended.

As a result, when an ICS mobile terminal engaged in a conference call or otherwise using multiple ICS sessions is transferred to a GERAN network without DTM support, the ICS mobile terminal will retain a single circuit-switched call associated with the active ICS session (or with the most-recently-active held session, if there are only held sessions). Since only the ICS mobile terminal and the SCC AS (but not the MSC server) are aware of the remaining held sessions, the other held sessions (and the current conference state) are lost.

However, if the SCC AS were able to detect that the ICS UE was transferred to GERAN without DTM, then the SCC AS could attempt to establish the held CS calls in MSC server using the MSC server-assisted mid-call feature (if supported by MSC server and SCC AS). However, without the techniques described below, the SCC AS is unaware of the ICS UE being transferred to GERAN without DTM, and can detect this change of camping only after a SIP re-INVITE request (or other in-dialog SIP request) sent toward the ICS UE fails. This may be too late, as the user at ICS UE may have already released the held sessions or even all calls.

These problems can be addressed by applying one or more of several related techniques to the network 100 of FIG. 1. With some of these techniques, when a circuit-switched call controlled by Gm signaling is established, or when Gm control of the circuit-switched call is added, then the SCC AS 130 will request the MSC server 150 to inform the SCC AS 130 about the access network used by the ICS UE 110, and/or whether simultaneous transport of IP data and support of a circuit-switched call is possible. The MSC server 150 keeps the SCC AS 130 informed of changes to the status of the ICS UE 110. As a result, when MSC server 150 informs SCC AS 130 that the UE 110 has moved to a GERAN without DTM, the SCC AS 130 will trigger the MSC server-assisted mid-call feature and MSC server 150 will create a transaction identifier for each held circuit-switched call. Meanwhile, when the ICS UE 110 detects that it has moved to GERAN without DTM, the ICS UE 110 will also create corresponding transaction identifiers for the held circuit-switched call. In this manner, the held session will be preserved.

In another approach, when ICS UE 110 detects that it has moved to GERAN without DTM, the ICS UE 110 will put the circuit-switched call controlled by Gm signaling on hold, using conventional circuit-switched signaling techniques, and will perform a packet-switched to circuit-switched (PS to CS) access transfer, using non-ICS procedures as specified in 3GPP TS 24.237. When the PS to CS access transfer request using non-ICS procedures for the active session is received, the SCC AS 130 can determine that this session transfer request has been sent by the UE 110 (because the request uses a Session Transfer Number, STN, and not a Session Transfer Number for Single Radio Voice Call Continuity, STN-SR), and that the DTM coverage must have been lost. The SCC AS 130 then performs the regular PS to CS access transfer, including transfer of the held session using MSC server-assisted mid-call feature (if supported by SCC AS 130 and MSC server 150).

Figure 2:
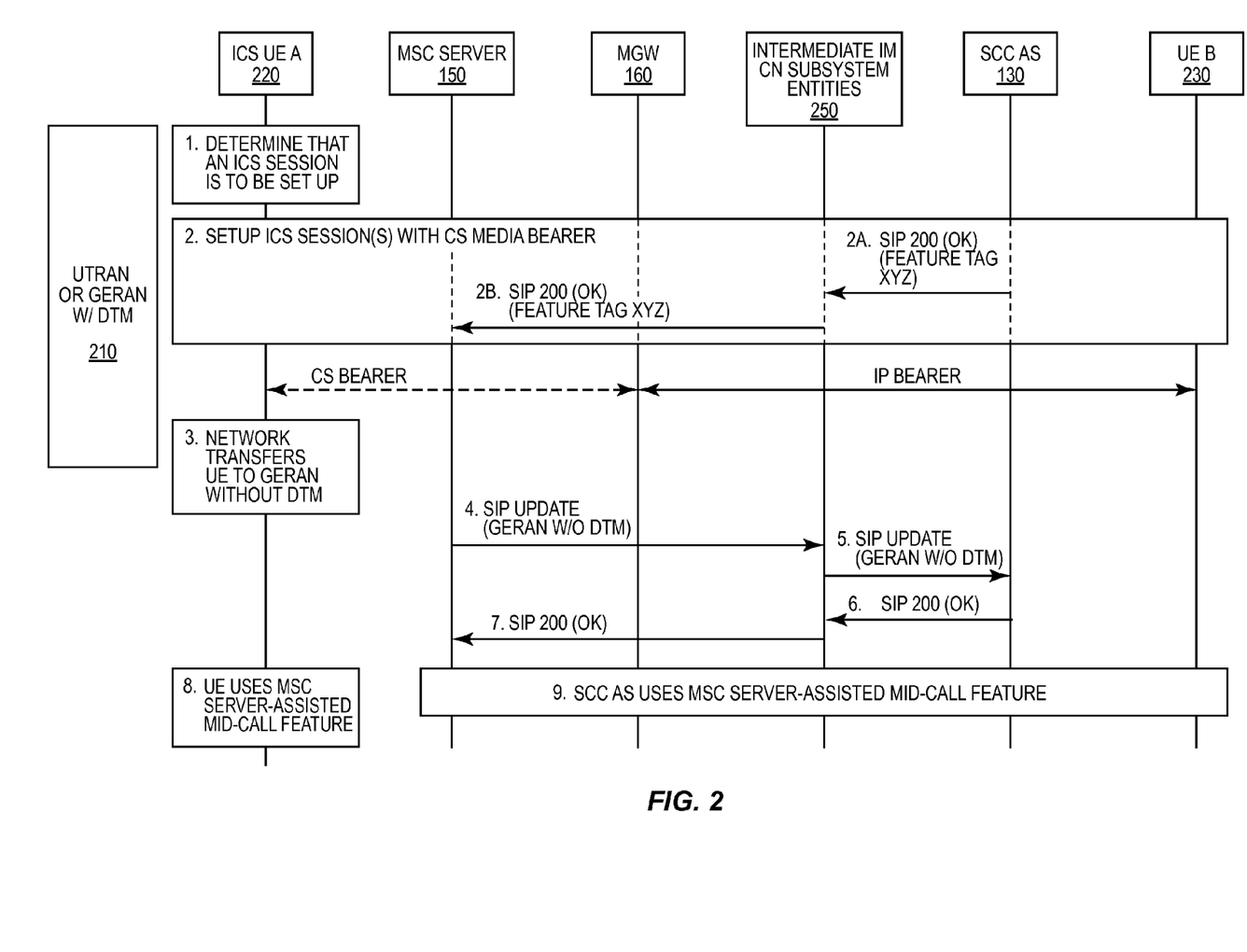
FIG. 2 illustrates an example message flow for managing ICS sessions upon transfer of a mobile terminal to a network that does not support simultaneous IP transport and circuit-switched bearers.

FIG. 2 illustrates a signaling flow for several embodiments of these techniques, involving one or more ICS sessions including at least two end user terminals, ICS UE A 220 and IP-phone UE B 230. In one embodiment, when the SCC AS 130 sends a SIP request or response related to a circuit-switched call controlled by Gm towards the MSC server (enhanced for ICS) 150, then the SCC AS 130 includes a feature tag XYZ. The feature tag XYZ indicates to the MSC server 150 that the SCC AS 130 wishes to be informed of changes in status for ICS UE A 220. Thus, if the received SIP request or response includes the feature tag XYZ, when the MSC server 150 subsequently detects that ICS UE A 220 moved between access networks (e.g., from UTRAN or GERAN with DTM to GERAN without DTM), then the MSC server 150 sends a SIP UPDATE or SIP INFO message to SCC AS 130, indicating the access network to which the ICS UE A 220 is attached and whether simultaneous transport of IP data and support of a circuit-switched call is possible or not.

If the SCC AS 130 receives the SIP UPDATE or SIP INFO and an indication that simultaneous transport of IP data and support of a circuit-switched call is not possible, the SCC AS 130 starts the MSC server-assisted mid-call feature and releases the old Gm access leg.

In one or more such embodiments, the basic flow for the originating ICS session set-up (specified in 3GPP TS 24.292, A.4.1) is modified as shown in FIG. 2. At step 1, the ICS UE A 220, accessing the IMS network via a radio access network 210 that supports simultaneous IP transport and circuit-switched call, such as UTRAN or GERAN with DTM, determines that an ICS session is to be set up. At step 2, one or more end-to-end ICS sessions are established between ICS UE A 220 and UE B 230. As seen at steps 2A and 2B in FIG. 2, this process includes the transfer of a SIP 200 (OK) message from the SCC AS 130 to the MSC server 150 (via intermediate IM CN subsystem entities 250); this SIP 200 (OK) message includes feature tag XYZ. After the ICS session setup of step 2, a circuit-switched bearer is established between ICS UE A 220 and Media Gateway 160, and an IP bearer is established form Media Gateway 160 to UE B 230.

At step 3, ICS UE A 220 is transferred to a network that does not support simultaneous IP transport and support of a circuit-switched bearer, such as a GERAN network without DTM. When MSC server 150 detects this transfer, it sends a SIP UPDATE to SCC AS 130 (via intermediate IM CN subsystem entities 250), as shown at steps 4 and 5. The SIP UPDATE indicates the network to which UE 220 A has been transferred, e.g., GERAN without DTM, and also includes an indication of whether the target network provides simultaneous support of a circuit-switched call and transport of IP data. (In an alternative embodiment, the SIP UPDATE does not identify the specific network to which UE A 220 has been transferred, but indicates whether simultaneous support of a circuit-switched call and transport of IP data is available). The SCC AS 130 confirms the SIP UPDATE with a SIP 200 (OK), as shown at steps 6 and 7.

From the SIP UPDATE, the SCC AS 130 can detect that UE A 220 is no longer able to simultaneously support a circuit-switched call and the transport of IP data. Because the ICS UE A 220 and the SCC AS 130 are now each aware of the change in status, each can use the MSC server-assisted mid-call feature to maintain one or more held sessions, as shown at steps 8 and 9. The SCC AS 130 can then release the old Gm access leg, as it is no longer accessible to the UE 220.

Figure 3:
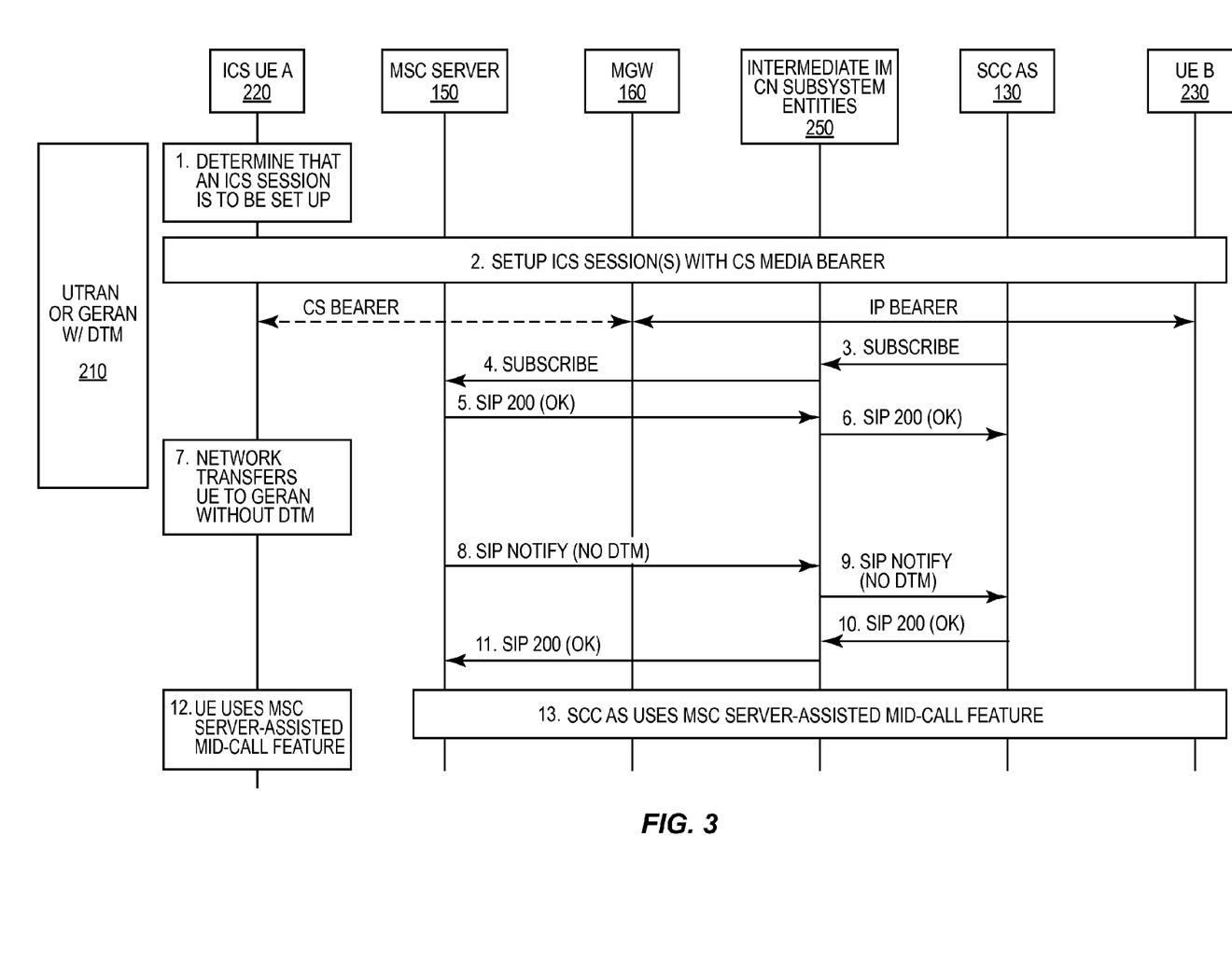
FIG. 3 illustrates another message flow for managing ICS sessions upon transfer of a mobile terminal to a network that does not support simultaneous IP transport and circuit-switched bearers.

FIG. 3 illustrates another signaling flow, applicable to a variant of the techniques illustrated in FIG. 2. In systems using this approach, the SCC AS 130 sends a SIP SUBSCRIBE message to the MSC server (enhanced for ICS) 150. This message can be sent on the creation of the first session controlled by Gm with a circuit-switched call; the SCC AS 130 de-subscribes when the last such session is released. The SUBSCRIBE message indicates to the MSC server 150 that the SCC AS 130 wishes to be informed of changes in status for ICS UE A 220. Thus, if the SCC AS 130 has subscribed, when the MSC server 150 subsequently detects that ICS UE A 220 moved between access networks (e.g., from UTRAN or GERAN with DTM to GERAN without DTM), then the MSC server 150 sends a SIP NOTIFY message to SCC AS 130, indicating the access network to which the ICS UE A 220 is attached and whether simultaneous transport of IP data and support of a circuit-switched call is possible or not.

If the SCC AS 130 receives the SIP NOTIFY message, including an indication that simultaneous transport of IP data and support of a circuit-switched call is not possible, the SCC AS 130 starts the MSC server-assisted mid-call feature and releases the old Gm access leg.

In one or more such embodiments, the basic flow for the originating ICS session set-up (specified in 3GPP TS 24.292, A.4.1) is modified as shown in FIG. 3. At step 1, the ICS UE A 220, accessing the IMS network via a radio access network 210 that supports simultaneous IP transport and circuit-switched call, such as UTRAN or GERAN with DTM, determines that an ICS session is to be set up. At step 2, one or more end-to-end ICS sessions are established between ICS UE A 220 and UE B 230. This is done in the same manner as discussed above for FIG. 2.

At the first establishment of an ICS session controlled by Gm signaling, SCC AS 130 sends a SIP SUBSCRIBE message to MSC server 150 (via intermediate IM CN subsystem entities 250), as shown at steps 3 and 4 of FIG. 3; this SUBSCRIBE is confirmed by the MSC server 150 at steps 5 and 6.

At step 7, ICS UE A 220 is transferred to a network that does not support simultaneous IP transport and support of a circuit-switched bearer, such as a GERAN network without DTM. When MSC server 150 detects this transfer, it sends a SIP NOTIFY to SCC AS 130 (via intermediate IM CN subsystem entities 250), as shown at steps 8 and 9. The SIP NOTIFY indicates whether the target network provides simultaneous support of a circuit-switched call and transport of IP data, and may also indicate the network or type of network to which UE 220 A has been transferred, e.g., GERAN without DTM. The SCC AS 130 confirms the SIP NOTIFY with a SIP 200 (OK), as shown at steps 10 and 11.

From the SIP NOTIFY, the SCC AS 130 can detect that UE A 220 is no longer able to simultaneously support a circuit-switched call and the transport of IP data. Because the ICS UE A 220 and the SCC AS 130 are now each aware of the change in status, each can use the MSC server-assisted mid-call feature to maintain one or more held sessions, as shown at steps 12 and 13. The SCC AS 130 can then release the old Gm access leg, as it is no longer accessible to the UE 220.

Figure 4:
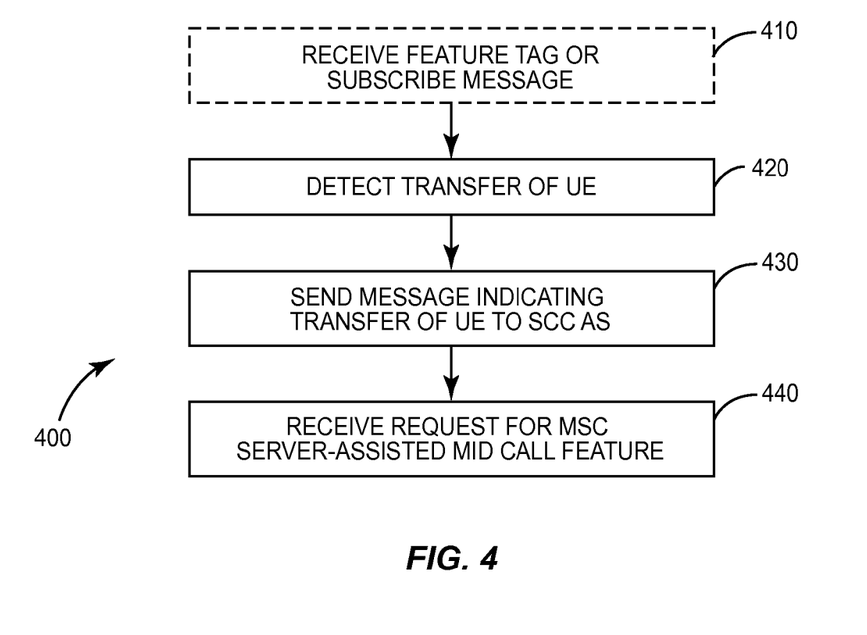
FIG. 4 is a process flow diagram illustrating a method for managing ICS sessions.
Figure 5:
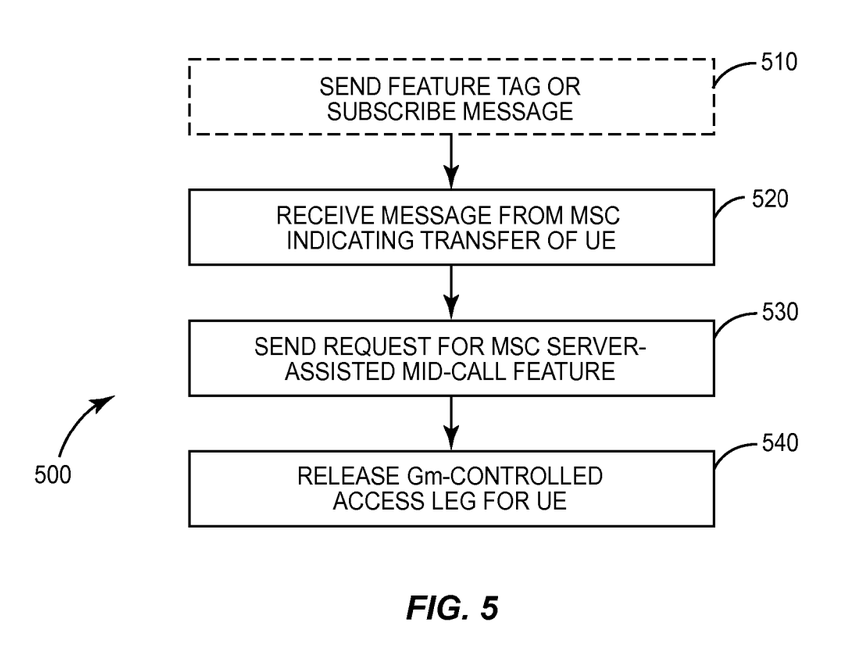
FIG. 5 is another process flow diagram illustrating a method for managing ICS sessions.

FIG. 4 illustrates a process flow illustrating a method 400, generally corresponding to the signaling flows of FIGS. 2 and 3, for managing IMS Centralized Services (ICS) sessions. The process flow of FIG. 4 may be carried out at an MSC server, such as the MSC server 150 of FIGS. 1-3. A corresponding process flow, for implementation at application server, such as the SCC AS 130 of FIGS. 1-3, is illustrated in FIG. 5.

Referring first to FIG. 4, the illustrated method 400 begins with the step of receiving at the MSC server, from the SCC AS, a SIP request or SIP response, the SIP request or SIP response including an indication that the SCC AS is requesting notification of any transfer of the user terminal, or an indication that the SCC AS is requesting notification of transfers of the user terminal to an access network in which the user terminal cannot support transport of IP data simultaneously with a circuit-switched call. This is shown at block 410, which is enclosed in a dashed outline to indicate that this step is optional, in that an MSC server could alternatively be configured to always provide notification of user terminal transfers, for example. In some embodiments, this indication may be a feature tag, while in others the indication may comprise a SUBSCRIBE message.

The illustrated method 400 continues, as shown at block 420, with detecting, at the MSC server, that a user terminal has been transferred from a first access network to a second access network. In response to this detecting, the MSC server sends a first message to the SCC AS, as shown at block 430, the first message indicating that the user terminal has been transferred. Finally, in response to this first message, one or more requests for MSC server-assisted mid-call feature services for the user terminal are received at the MSC server, as shown at block 440, in response to which the MSC server assigns transaction identifiers to one or more sessions held for the user terminal or to one or more conference participants corresponding to the user terminal.

In some embodiments of the technique illustrated in FIG. 4, the first message (sent from the MSC server to the SCC AS) comprises information indicating a type of the second network. In some embodiments, the MSC server, after detecting transfer of the user terminal, determines that the user terminal is unable to simultaneously support a circuit-switched call and the transport of IP data in the second access network, and sends the first message to the SCC AS in response to said detecting and said determining. In some of these embodiments, the first message includes an indication that the user terminal is unable to simultaneously support a circuit-switched call and the transport of IP data in the second network. The first message in any of these embodiments may comprise one of several SIP messages, such as a SIP UPDATE message, a SIP INFO message, or a SIP NOTIFY message.

Referring now to FIG. 5, which is a corresponding process flow for implementation at an SCC AS, the illustrated method 500 beings with the optional step, as shown at block 510, of sending an indication to an MSC server that the SCC AS is requesting notification when the user terminal is transferred, or that the SCC AS is requesting notification when the user terminal is transferred to an access network in which the user terminal cannot support transport of IP data simultaneously with a circuit-switched call. In various embodiments, this step comprises the sending of at least one of: a SIP request including an indication that the SCC AS is requesting notification when the user terminal is transferred; a SIP response including an indication that the SCC AS is requesting notification when the user terminal is transferred; a SIP request that includes an indication that the SCC AS is requesting notification when the user terminal is transferred to an access network in which the user terminal cannot support transport of IP data simultaneously with a circuit-switched call; a SIP response that includes a fourth indication indicating that the SCC AS is requesting notification when the user terminal is transferred to an access network in which the user terminal cannot support transport of IP data simultaneously with a circuit-switched call; a SIP SUBSCRIBE request indicating that the SCC AS is requesting notification when the user terminal is transferred; and a SIP SUBSCRIBE request indicating that the SCC AS is requesting notification when the user terminal is transferred to an access network in which the user terminal cannot support transport of IP data simultaneously with a circuit-switched call. In several of these approaches, the indication that the SCC AS is requesting notification may comprise a feature tag.

The illustrated process continues, as shown at block 520, with receiving a first message from the MSC server, the first message indicating that a user terminal engaged in one or more ICS sessions has been transferred from a first access network to a second access network. In some embodiments, the first message comprises information indicating a type of the second access network. In some embodiments, the message may indicate that the user terminal is unable to simultaneously support a circuit-switched call and the transport of IP data in the second network. In various embodiments, this first message is a SIP message, such as a SIP UPDATE message, a SIP INFO message, or a SIP NOTIFY message In response to this first message, the SCC AS sends one or more requests for MSC server-assisted mid-call feature services for the user terminal, as shown at block 530, and releases an access leg corresponding to the user terminal and controlled by Gm signaling, as shown at block 540.

In an alternative to the techniques illustrated in FIGS. 2-5, PS to CS access transfer procedures (described in 3GPP TS 24.237) are used as part of the process for managing ICS sessions when a user terminal is transferred to a network that does not support simultaneous circuit-switched calls and transport of IP data. In this approach, when the ICS user terminal moves to such a network, such as GERAN without DTM, the ICS user terminal puts the existing circuit-switched call on hold, using conventional circuit-switched procedures such as those described in 3GPP TS 24.008. The user terminal then performs a PS to CS access transfer, using the non-ICS procedures specified in 3GPP TS 24.237, Sections 9.2.1 and 9.2.1A (if applicable). Despite the fact that the circuit-switched call was put on hold, the SCC AS will still consider the ICS session to be active (since this is the state given by Gm control), but can determine that the user terminal has been transferred to a network that does not support simultaneous circuit-switched calls and transport of IP data by detecting that the session transfer request was sent via the I2 reference point. When the PS to CS access transfer request using non-ICS procedures is received, the SCC AS responds as specified in 3GPP TS 24.237, Sections 9.3.2 and 9.3.2A (if applicable).

Figure 6:
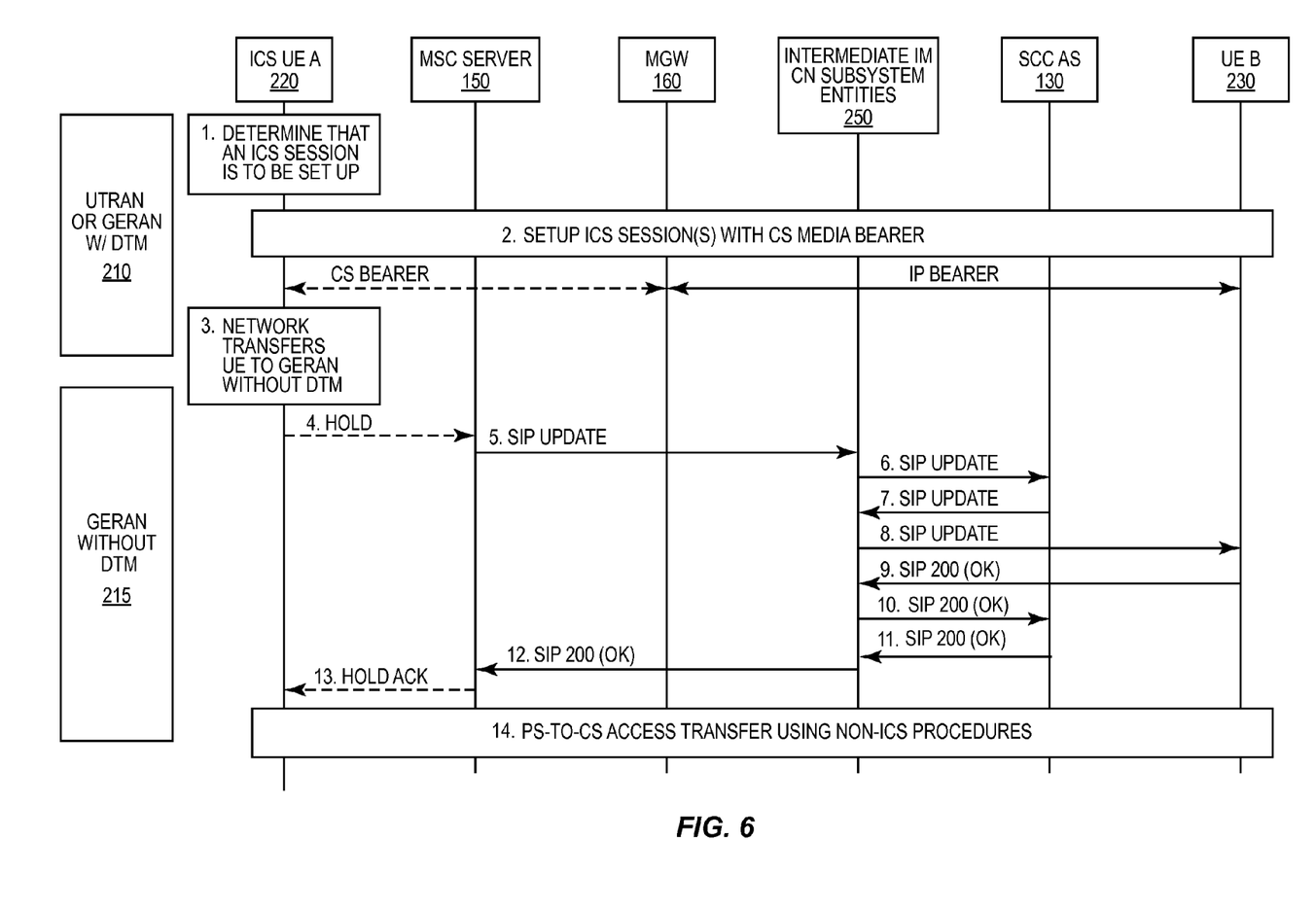
FIG. 6 illustrates another message flow for managing ICS sessions upon transfer of a mobile terminal to a network that does not support simultaneous IP transport and circuit-switched bearers.

FIG. 6 illustrates a signaling flow for several embodiments of this technique, again involving one or more ICS sessions between at least two end user terminals, ICS UE A 220 and IP-phone UE B 230. At step 1, the ICS UE A 220, accessing the IMS network via a radio access network 210 that supports simultaneous IP transport and circuit-switched call, such as UTRAN or GERAN with DTM, determines that an ICS session is to be set up. At step 2, one or more end-to-end ICS sessions are established between ICS UE A 220 and UE B 230. Details of this set-up process were described above in connection with the signal flow of FIG. 2. After the ICS session setup of step 2, a circuit-switched bearer is established between ICS UE A 220 and Media Gateway 160, and an IP bearer is established form Media Gateway 160 to UE B 230.

At step 3, ICS UE A 220 is transferred to a network 215 that does not support simultaneous IP transport and support of a circuit-switched bearer, such as a GERAN network without DTM. When the ICS UE A 220 detects this transfer, it puts the circuit-switched call on hold, as shown at FIG. 6's step 4, using conventional procedures. In response, the MSC server 150 sends a SIP UPDATE to SCC AS 130 (via intermediate IM CN subsystem entities 250), as shown at steps 5 and 6. The SCC AS 130 updates UE B 230 that the call is placed on hold, as shown at steps 7 and 8. The changes in status are confirmed with SIP 200 (OK) messages, as shown at steps 9, 10, 11, and 12, and the hold request is acknowledged to ICS UE A 220, as shown at step 13. Finally, UE A 220 performs a PS to CS access transfer, using non-ICS procedures as described in 3GPP TS 24.237.

At this point, as noted above, the SCC AS considers the circuit-switched call to be active, since it is still indicated as such in Gm control. Because the ICS UE A 220 and the SCC AS 130 are now each aware of the change in status, each can use the MSC server-assisted mid-call feature to maintain one or more held sessions. The SCC AS 130 can then release the old Gm access leg, as it is no longer accessible to the UE 220.

Figure 7:
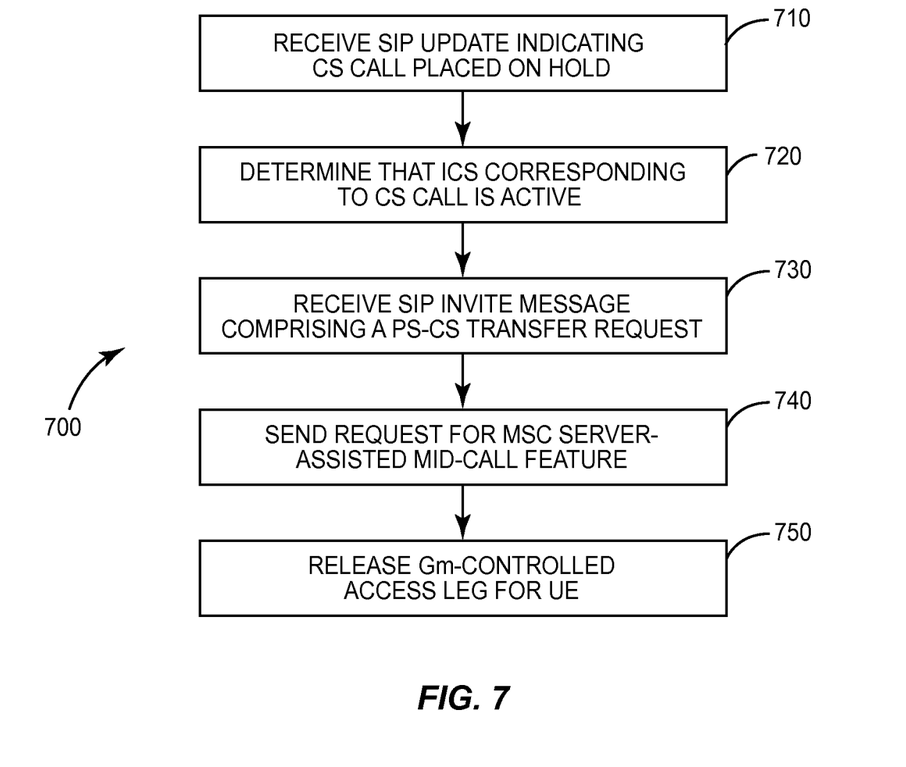
FIG. 7 is another process flow diagram illustrating a method for managing ICS sessions.

FIG. 7 illustrates a process flow corresponding generally to the signaling flow of FIG. 6. The illustrated method 700 may be implemented at an SCC AS, and begins, as shown at block 710, with receiving a SIP UPDATE message indicating that a circuit-switched call anchored at the SCC AS is being placed on hold. As shown at block 720, the SCC AS then determines that an ICS session corresponding to the circuit-switched call is still active, by detecting that the SIP UPDATE message was sent via an MSC server. The SCC AS also receives a SIP INVITE message comprising a PS-CS session transfer request corresponding to the ICS session, as shown at block 730. The SCC AS then sends one or more requests for MSC server-assisted mid-call feature services for the ICS session, as shown at block 740, and releases an access leg controlled by Gm signaling and corresponding to the ICS session, as shown at block 750.

Figure 8:
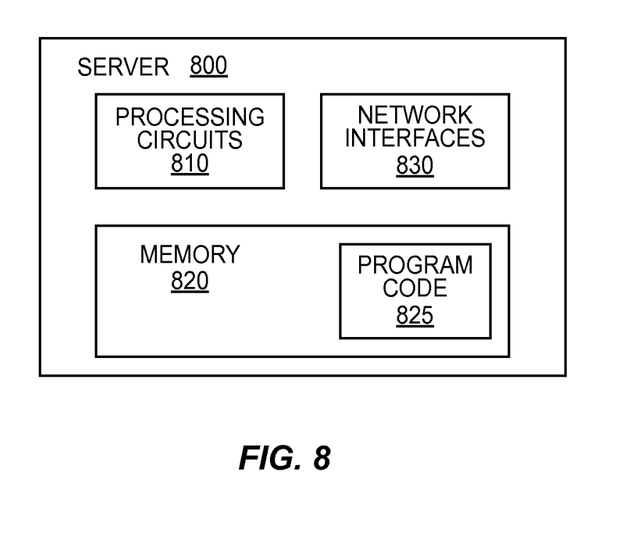
FIG. 8 is a block diagram illustrating components of an Mobile Switching Center server or a Service Centralization and Continuity Application Server.

Those skilled in the art will appreciate that the various methods and processes described above may be implemented using various hardware configurations, generally (but not necessarily) including the use of one or more microprocessors, microcontrollers, digital signal processors, or the like, coupled to memory storing software instructions for carrying out the techniques described herein. FIG. 8 thus illustrates a block diagram for an example server 800, which may correspond to either an MSC server or SCC AS server. Of course, configurations other than the one pictured are possible. However, the illustrated server 800 includes processing circuits 810, memory 820, and network interface circuitry 830. Processing circuits 810 may comprise one or more microprocessors configured to execute program code 825, stored in memory 820 and comprising instructions for carrying out one or more of the techniques described above for managing multiple ICS sessions.

The detailed design and cost tradeoffs for the various hardware approaches possible for server 800, which may depend on system-level requirements that are outside the scope of the present disclosure, are well known to those of ordinary skill in the art, and are not necessary to a full understanding of the presently disclosed techniques. Accordingly further details of specific hardware implementation are not disclosed herein. Furthermore, those skilled in the art will appreciate that the circuits of various embodiments of server 800 may be configured in ways that vary in certain details from the broad descriptions given above. For instance, one or more of the signal processing and control functionalities discussed above may be implemented using dedicated hardware, rather than a microprocessor configured with program instructions. Such variations, and the engineering tradeoffs associated with each, will be readily appreciated by the skilled practitioner.

Indeed, all of the foregoing description and the accompanying drawings represent non-limiting examples of the methods and apparatus taught herein. As such, the present invention is not limited by the foregoing description and accompanying drawings. Instead, the present invention is limited only by the following claims and their legal equivalents.

What is claimed is:

1. A method in a wireless network for managing IP Multimedia Subsystem (IMS) Centralized Services (ICS) sessions, the method comprising:
   receiving at a Mobile Switching Center (MSC) server from a Service Centralization and Continuity Application Server (SCC AS), a first message including an indication that the SCC AS is requesting notification of a change in status of a user terminal;
   subsequent to receipt of said first message, detecting, at the MSC server, that the user terminal has been transferred from a first access network to a second access network;
   determining, at the MSC server, that the user terminal is unable to simultaneously support a circuit-switched call and the transport of IP data in the second access network; and
   in response to said detecting and said determining, sending a second message to the SCC AS from the MSC server, the second message including an indication that the user terminal is unable to simultaneously support a circuit-switched call and the transport of IP data in the second access network, and indicating that the user terminal has been transferred;
   receiving, in response to said second message, one or more requests for MSC server-assisted mid-call feature services for the user terminal to maintain one or more held ICS sessions or conferences; and
   assigning transaction identifiers to one or more sessions held for the user terminal or to one or more conference participants corresponding to the user terminal, in response to said requests.

2. The method of claim 1, wherein the second message comprises information indicating a type of the second network.

3. The method of claim 1, wherein the second message comprises one of: a SIP UPDATE message; a SIP INFO message; and a SIP NOTIFY message.

4. The method of claim 1, wherein the first message comprises one of a SIP request and a SIP response, and wherein the indication in the first message requests notification of any transfers of the user terminal.

5. The method of claim 4, wherein said indication in the first message comprises a feature tag.

6. The method of claim 1, wherein the first message comprises one of a SIP request and a SIP response, and wherein the indication in the first message requests notification of transfers of the user terminal to an access network in which the user terminal cannot support transport of IP data simultaneously with a circuit-switched call.

7. The method of claim 6, wherein said indication comprises a feature tag.

8. The method of claim 1, wherein said first message comprises a SIP SUBSCRIBE request indicating that the SCC AS is requesting notification of any transfer of the user terminal.

9. The method of claim 1, wherein said first message comprises a SIP SUBSCRIBE request indicating that the SCC AS is requesting notification when the user terminal is transferred to an access network in which the user terminal cannot support transport of IP data simultaneously with a circuit-switched call.

10. A Mobile Switching Center (MSC) server configured to manage IP Multimedia Subsystem (IMS) Centralized Services (ICS) sessions, the MSC server comprising a network interface circuit configured for communication with a Service Centralization and Continuity Application Server (SCC AS) via a Call Session Control Function (CSCF) and a processing circuit configured to:
   receive, from said SCC AS, a first message including an indication that the SCC AS is requesting notification of a change in status of the user terminal;
   detect that a user terminal has been transferred from a first access network to a second access network;
   determine that the user terminal is unable to simultaneously support a circuit-switched call and the transport of IP data in the second access network;
   in response to said detecting and said determining, send a second message to a SCC AS from the MSC server, the second message including an indication that the user terminal is unable to simultaneously support a circuit-switched call and the transport of IP data in the second access network, and indicating that the user terminal has been transferred;

receive, in response to said second message, one or more requests for MSC server-assisted mid-call feature services for the user terminal; and assign transaction identifiers to one or more sessions held for the user terminal or to one or more conference participants corresponding to the user terminal, in response to said requests.

11. A method in a wireless network for managing IP Multimedia Subsystem (IMS) Centralized Services (ICS) sessions, the method comprising:

sending a first message from a Service Centralization and Continuity Application Server (SCC AS) to a Mobile Switching Center (MSC) server responsive to detecting that a circuit-switched call for a user terminal is being controlled by Gm signaling, the first message including an indication that the SCC AS is requesting notification of a change in status of the user terminal;

subsequent to sending the first message, receiving a second message from the MSC server at the SCC AS, the second message comprising an indication that the user terminal is unable to simultaneously support a circuit-switched call and the transport of IP data in a second access network, and indicating that the user terminal engaged in one or more ICS sessions has been transferred from a first access network to the second access network;

in response to the second message, sending one or more requests for MSC server-assisted mid-call feature services for the user terminal to maintain one or more held ICS sessions for the user terminal; and releasing an access leg for the Gm signaling.

12. The method of claim 11, wherein the second message comprises information indicating a type of the second access network.

13. The method of claim 11, wherein one or more requests for MSC server-assisted mid-call feature services for the user terminal are sent in response to said indication.

14. The method of claim 11, wherein the second message comprises one of: a SIP UPDATE message; a SIP INFO message; and a SIP NOTIFY message.

15. The method of claim 11, wherein the first message comprises one of a SIP request and a SIP response, and wherein the indication comprises a feature tag in the SIP request or the SIP response.

16. The method of claim 15, wherein the first message comprises a SIP SUBSCRIBE request.

17. A Service Centralization and Continuity Application Server (SCC AS) configured to manage IP Multimedia Subsystem (IMS) Centralized Services (ICS) sessions, the SCC AS comprising a network interface circuit configured to communicate with a Mobile Switching Center (MSC) server via a Call Session Control Function (CSCF) and a processing circuit configured to:

send a first message to the MSC server responsive to detecting that a circuit-switched call for a user terminal is being controlled by Gm signaling, the first message including an indication that the SCC AS is requesting notification of a change in status of the user terminal;

receive a second message from the MSC server, the second message comprising an indication that the user terminal is unable to simultaneously support a circuit-switched call and the transport of IP data in a second access network, and indicating that the user terminal engaged in one or more ICS sessions has been transferred from a first access network to the second access network;

in response to the second message, send one or more requests for MSC server-assisted mid-call feature services for the user terminal to maintain one or more held ICS sessions for the user terminal; and release an access leg for the Gm signaling.

18. The SCC AS of claim 17, wherein the processing circuit is configured to send the one or more requests for MSC server-assisted mid-call feature services for the user terminal in response to said indication.

19. The SCC AS of claim 17, wherein the first message sent by the processing circuit comprises one of a SIP request and a SIP response, and wherein the indication comprises a feature tag in the SIP request or the SIP response.

20. The SCC AS of claim 19, wherein the first message sent by the processing circuit comprises a SIP SUBSCRIBE request.

21. A method in a wireless network for managing IP Multimedia Subsystem (IMS) Centralized Services (ICS) sessions, the method comprising:

receiving, at a Service Centralization and Continuity Application Server (SCC AS), a SIP UPDATE message indicating that a user terminal engaged in one or more ICS sessions has been transferred from a first access network to a second access network and is unable to simultaneously support a circuit-switched call and the transport of IP data in the second access network, and that a circuit-switched call supported by Gm signaling is being placed on hold;

in response to the SIP UPDATE message, placing the ICS session corresponding to the circuit-switched call on hold;

after placing the ICS session on hold, receiving, at the SCC AS, a SIP INVITE message comprising a PS-CS session transfer request corresponding to the ICS session;

detecting that the SIP INVITE message was sent via an MSC server;

in response to the detecting, sending one or more requests for Mobile Switching Center (MSC) Server-assisted mid-call feature services for the ICS session; and releasing an access leg for Gm signaling.

* * * * *

UNITED STATES PATENT AND TRADEMARK OFFICE
CERTIFICATE OF CORRECTION

PATENT NO. : 8,509,120 B2  
APPLICATION NO. : 12/952968  
DATED : August 13, 2013  
INVENTOR(S) : Sedlacek et al.

Page 1 of 1

It is certified that error appears in the above-identified patent and that said Letters Patent is hereby corrected as shown below:

On the title page, item (56), References Cited under "OTHER PUBLICATIONS", in Column 2, Line 1, delete "SR-VVV" and insert -- SR-VCC --, therefor.

On the title page, item (56), References Cited under "OTHER PUBLICATIONS", in Column 2, Line 2, delete "Tarfet" and insert -- Target --, therefor.

On the title page, item (56), References Cited under "OTHER PUBLICATIONS", in Column 2, Line 4, delete "3RE" and insert -- 3RD --, therefor.

On the title page, item (56), References Cited under "OTHER PUBLICATIONS", in Column 2, Line 6, delete "'MID" and insert -- "MID --, therefor.

On the title page, item (56), References Cited under "OTHER PUBLICATIONS", in Column 2, Line 8, delete "Used," and insert -- used," --, therefor.

On the title page, item (56), References Cited under "OTHER PUBLICATIONS", in Column 2, Line 8, delete "$2" and insert -- S2 --, therefor.

On title page 2, item (56), References Cited under "OTHER PUBLICATIONS", in Column 2, Lines 8-11, delete "3RD Generation Partnership Project, Source: Nortel, Huawei, ……………… Mar. 3, 2009, Hangzhou, China.".

In the Specification

In Column 3, Line 19, delete "received" and insert -- received. --, therefor.

In Column 4, Lines 44-45, delete "an Mobile" and insert -- a Mobile --, therefor.

In Column 9, Line 67, delete "message" and insert -- message. --, therefor.

Signed and Sealed this  
Twentieth Day of May, 2014

Michelle K. Lee  
*Deputy Director of the United States Patent and Trademark Office*